(12) United States Patent
Zhang et al.

(10) Patent No.: US 7,656,949 B1
(45) Date of Patent: Feb. 2, 2010

(54) METHODS AND APPARATUS FOR PERFORMING EFFICIENT INVERSE TRANSFORM OPERATIONS

(75) Inventors: Ji Zhang, San Jose, CA (US); Shan Zhu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 672 days.

(21) Appl. No.: 09/894,113

(22) Filed: Jun. 27, 2001

(51) Int. Cl.
H04N 7/12 (2006.01)
(52) U.S. Cl. .............................. 375/240.02; 375/240.18
(58) Field of Classification Search ............ 375/240.02, 375/240.18, 240.03, 240.2, 240.24; 382/248, 382/251, 239, 298, 209; 348/248, 251, 239, 348/298, 209; 725/105; 341/63
See application file for complete search history.

(56) References Cited

U.S. PATENT DOCUMENTS

| | | | |
|---|---|---|---|
| 5,493,456 A | 2/1996 | Augenbraun et al. | |
| 5,570,197 A | 10/1996 | Boon | |
| 5,689,346 A | 11/1997 | Noda et al. | |
| 5,751,701 A | 5/1998 | Langberg et al. | |
| 5,754,235 A | 5/1998 | Urano et al. | |
| 5,768,536 A | 6/1998 | Strongin et al. | |
| 5,812,786 A | 9/1998 | Seazholtz et al. | |
| 5,872,866 A | 2/1999 | Strongin et al. | |
| 6,002,801 A | 12/1999 | Strongin et al. | |
| 6,009,203 A | 12/1999 | Liu et al. | |
| 6,026,097 A | 2/2000 | Voois et al. | |
| 6,111,913 A * | 8/2000 | Murdock et al. | 375/240.03 |
| 6,304,604 B1 * | 10/2001 | Adiletta et al. | 375/240.18 |
| 6,377,627 B1 * | 4/2002 | Shen et al. | 375/240.2 |
| 6,549,667 B1 * | 4/2003 | Fukuda et al. | 382/234 |
| 6,650,707 B2 | 11/2003 | Youn et al. | |
| 6,701,016 B1 * | 3/2004 | Jojic et al. | 382/209 |
| 6,763,070 B1 * | 7/2004 | Lee | 375/240.2 |
| 7,054,362 B1 * | 5/2006 | Shen et al. | 375/240.02 |
| 7,114,174 B1 * | 9/2006 | Brooks et al. | 725/105 |
| 2001/0021268 A1 | 9/2001 | Jun et al. | |

(Continued)

FOREIGN PATENT DOCUMENTS

EP 0 103 438 A1 3/1984

(Continued)

OTHER PUBLICATIONS

Winger, Lowell, "Source Adaptive System And Method For 2D iDCT", U.S. Appl. No. 09/874,587, filed Jun. 4, 2001, 36 pages.

(Continued)

*Primary Examiner*—Gims S Philippe
(74) *Attorney, Agent, or Firm*—Weaver Austin Villeneuve & Sampson LLP (57) ABSTRACT

According to the present invention, methods and apparatus for performing efficient inverse transform operations are provided. Zero patterns are identified in a block of transform coefficients to derive zero pattern information. Using the zero pattern information, inverse transform operations are performed on a subset of the columns of the block of transform coefficients. Zero patterns can optionally be identified in the resulting block. One-dimensional inverse transform operations are then performed on the rows of the resulting block to complete the inverse transform. In another example, one-dimensional inverse transform operations can be performed first on the rows and then on the columns.

26 Claims, 6 Drawing Sheets

U.S. PATENT DOCUMENTS

2002/0027954 A1    3/2002  Singh et al.
2002/0080052 A1*   6/2002  Gobert .................. 341/63

FOREIGN PATENT DOCUMENTS

| EP | 00402674 | * | 9/2000 |
| GB | 1 523 753 | | 9/1978 |
| GB | 2 061 581 A | | 5/1981 |
| GB | 2 118 750 A | | 2/1983 |
| GB | 2 288 044 A | | 4/1995 |
| GB | 2 286 277 A | | 8/1995 |
| WO | WO87/06416 | | 10/1987 |

OTHER PUBLICATIONS

ATM Forum Technical Committee UNI 3.1 Specification, "*The ATM Forum Technical Committee*", User-Network Interface (UNI) Specification Version 3.1, Sep. 1994, 396 pages.

ANSI, "*American National Standard for Telecommunications—Network and Customer Installation Interfaces—Asymmetric Digital Subscriber Line (ADSL) Metallic Interface*", American National Standards Institute, ANSI T1.413-1995, Aug. 18, 1995, 170 pages.

ISO/IEP "*Information Technology-Generic Coding Of Moving Pictures And Associated Audio: Systems*", ISO/IEC 13818-1, Nov. 13, 1994, 135 pages.

ISO/IEP "*Information Technology-Generic Coding Of Moving Pictures And Associated Audio Information: Video*", ISO/IEC 13818-2, 1995, 209 pages.

ISO/IEP "*Information Technology-Generic Coding Of Moving Pictures And Associated Audio: Audio*", ISO/IEC 13808-3, Nov. 11, 1994, 104 pages.

U.S. Appl. No. 09/766,020, entitled "Methods for Efficient Bandwidth Scaling of Compressed Video Data", by inventor(s) Ji Zhang, filed Jan. 18, 2001.

U.S. Appl. No. 09/867,966, entitled "Methods and Apparatus for Transform Coefficient Filtering", by inventor(s) Fang Wu, filed May 29, 2001.

U.S. Appl. No. 09/874,587, entitled "Source Adaptive System and Method for 2D iDCT", by inventor(s) Winter, filed Jun. 4, 2001.

Office Action dated Oct. 5, 2004, U.S. Appl. No. 09/874,587.

Office Action dated May 20, 2005, U.S. Appl. No. 09/874,587.

Office Action mailed Sep. 22, 2005, U.S. Appl. No. 09/874,587.

Murata et al., "Fast 2D IDCT Implementation with Multimedia Instructions For a Software MPEG2 Decoder", Jun. 1998 IEEE International Conference on Image Processing, pp. 3105-3108.

Office Action mailed on Mar. 2, 2006 in related U.S. Appl. No. 09/874,587.

Office Action mailed on Nov. 2, 2006 in related U.S. Appl. No. 09/874,587.

Office Action mailed on Mar. 13, 2007 in related U.S. Appl. No. 09/874,587.

Notice of Allowance mailed on Nov. 1, 2007 in related U.S. Appl. No. 09/874,587.

Allowed Claims in related U.S. Appl. No. 09/874,587.

Advisory Action mailed Jul. 17, 2005, from U.S. Appl. No. 09/874,587.

Advisory Action mailed Apr. 6, 2006, from U.S. Appl. No. 09/874,587.

Advisory Action mailed May 29, 2007, from U.S. Appl. No. 09/874,587.

* cited by examiner

METHODS AND APPARATUS FOR PERFORMING EFFICIENT INVERSE TRANSFORM OPERATIONS

BACKGROUND OF THE INVENTION

The present invention relates to inverse transform operations. More specifically, the present invention relates to performing inverse transform operations more efficiently. Still more specifically, the present invention provides techniques for performing two-dimensional inverse transform operations on a block of transform coefficients by using one-dimensional inverse transform operations after identifying zero patterns in a block of transform coefficients.

Video data is one particularly relevant form of data that can benefit from improved techniques for rescaling. Video rescaling schemes allow digitized video frames to be represented digitally in an efficient manner. Rescaling digital video makes it practical to transmit the compressed signal by digital channels at a fraction of the bandwidth required to transmit the original signal without compression. Generally, compressing data or further compressing compressed data is referred to herein as rescaling data. International standards have been created on video compression schemes. The standards include MPEG-1, MPEG-2, MPEG-4, H.261, H.262, H.263, H.263+, etc. The standardized compression schemes mostly rely on several key algorithm schemes: motion compensated transform coding (for example, DCT transforms or wavelet/sub-band transforms), quantization of the transform coefficients, and variable length coding (VLC).

The motion compensated encoding removes the temporally redundant information inherent in video sequences. The transform coding enables orthogonal spatial frequency representation of spatial domain video signals. Quantization of the transformed coefficients reduces the number of levels required to represent a given digitized video sample and reduces bit usage in the compression output stream. The other factor contributing to rescaling is variable length coding (VLC) that represents frequently used symbols using code words. In general, the number of bits used to represent a given image determines the quality of the decoded picture. The more bits used to represent a given image, the better the image quality. The system that is used to compress digitized video sequence using the above described schemes is called an encoder or encoding system.

More specifically, motion compensation performs differential encoding of frames. Certain frames, such as I-frames in MPEG-2, continue to store the entire image, and are independent of other frames. Differential frames, such as B-frames or P-frames in MPEG-2, store motion vectors associated with the difference and coordinates of particular objects in the frames. The pixel-wise difference between objects is called the error term. In MPEG-2, P-frames reference a single frame while B-frames reference two different frames. Although this allows fairly high reduction ratios, motion compensation is limited when significant changes occur between frames. When significant changes occur between frames in a video sequence, a large number of frames are encoded as reference frames. That is, entire images and not just motion vectors are maintained in a large number of frames. This precludes high reduction ratios. Furthermore, motion compensation can be computationally expensive.

Each frame can be converted to luminance and chrominance components. As will be appreciated by one of skill in the art, the human eye is more sensitive to the luminance than to the chrominance of an image. In MPEG-2, luminance and chrominance frames are divided into 8×8 pixel blocks. The 8×8 pixel blocks are transformed using a discrete cosine transform (DCT) and scanned to create a DCT coefficient vector. Quantization involves dividing the DCT coefficients by a scaling factor. The divided coefficients can be rounded to the nearest integer. After quantization, some of the quantized elements become zero. The many levels represented by the transform coefficients are reduced to a smaller number of levels after quantization. With fewer levels represented, more sequences of numbers are similar. For example, the sequence 4.9 4.1 2.2 1.9 after division by two and rounding becomes 2 2 1 1. As will be described below, a sequence with more similar numbers can more easily be encoded using either arithmetic or Huffman coding. However, quantization is an irreversible process and hence introduces significant loss of information associated with the original frame or image.

Huffman or arithmetic coding takes the most common long sequences of numbers of bits and replaces them with a shorter sequence of numbers or bits. Again, Huffman or arithmetic coding is limited by common sequences of numbers or bits. Sequences that contain many different numbers are more difficult to encode.

Currently available compression techniques for compressing video or image data use transform and inverse transform operations. However, transform and inverse transform operations are computationally expensive and introduce delay into time sensitive data streams. The transform and inverse transform operations are often used in transcoding systems for scaling a data stream associated with one set of bandwidth requirements to a modified data stream associated with another set of bandwidth requirements. Transform encoded data is often rescaled to meet bandwidth limitations. Transform and inverse transform operations are often a bottleneck transcoding systems. It is therefore desirable to provide techniques for efficiently performing inverse transform operations. Techniques for efficiently performing inverse transform operations could be particularly useful in transcoding systems.

SUMMARY OF THE INVENTION

According to the present invention, methods and apparatus for performing efficient inverse transform operations are provided. Zero patterns are identified in a block of transform coefficients to derive zero pattern information. Using the zero pattern information, one-dimensional inverse transform operations are performed on a subset of the columns of the block of transform coefficients. Zero patterns can optionally be identified in the resulting block. One-dimensional inverse transform operations are then performed on the rows of the resulting block to complete the two-dimensional inverse transform. In another example, one-dimensional inverse transform operations can be performed first on the rows and then on the columns.

In one example, the block of transform coefficients is an MPEG encoded block. One-dimensional inverse transforms can be performed first on a subset of the total number of columns in the block of transforms coefficients followed by inverse transforms performed on all the rows in the block of transform coefficients. A determination can be made as to whether one-dimensional inverse transforms should be performed first on the columns or on the rows.

Another aspect of the invention provides an apparatus for performing one-dimensional inverse transforms on the rows and columns of a block of transform coefficients. The apparatus includes memory and a processor coupled with memory. The processor is configured to identify zero pattern information associated with the block of transform coefficients, perform one-dimensional inverse transforms on a subset of rows and columns of the block of transform coefficients using the zero pattern information.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

DETAILED DESCRIPTION OF SPECIFIC EMBODIMENTS

The present invention generally relates to data compression. Data compression techniques are described generally in *The Data Compression Book*, by Mark Nelson (ISBN: 1558514341), the entirety of which is hereby incorporated by reference for all purposes.

Many techniques for data compression are currently available. One technique for video compression is MPEG-2. MPEG-2 uses motion compensation, discrete cosine transforms, quantization, and variable length coding to scale data. Some of the more computationally expensive aspects of data compression schemes are the transform operations that are used to convert transform coefficients into data values. Transform operations are used during several stages including decoding or rescaling of encoded data. Rescaling data is described in patent application Ser. No. 09/766,020 titled Methods For Efficient Bandwidth Scaling Of Compressed Video Data at the date of filing on Jan. 18, 2001, the entirety of which is hereby incorporated by reference for all purposes.

The present invention provides techniques for improving upon the efficiency of computationally expensive transform operations. The techniques of the present invention will be described in the context of inverse discrete cosine transforms although the techniques are general and can be applied to a variety of transform operations. In one example, the present invention breaks down a two-dimensional inverse transform operation into one-dimensional inverse transform operations. One-dimensional inverse transform operations are performed selectively on the columns and rows of a block of transform coefficients. By applying inverse transform operations only on selected columns and rows, the techniques of the present invention can minimize the computational expenses associated with inverse transform operations.

Figure 1:
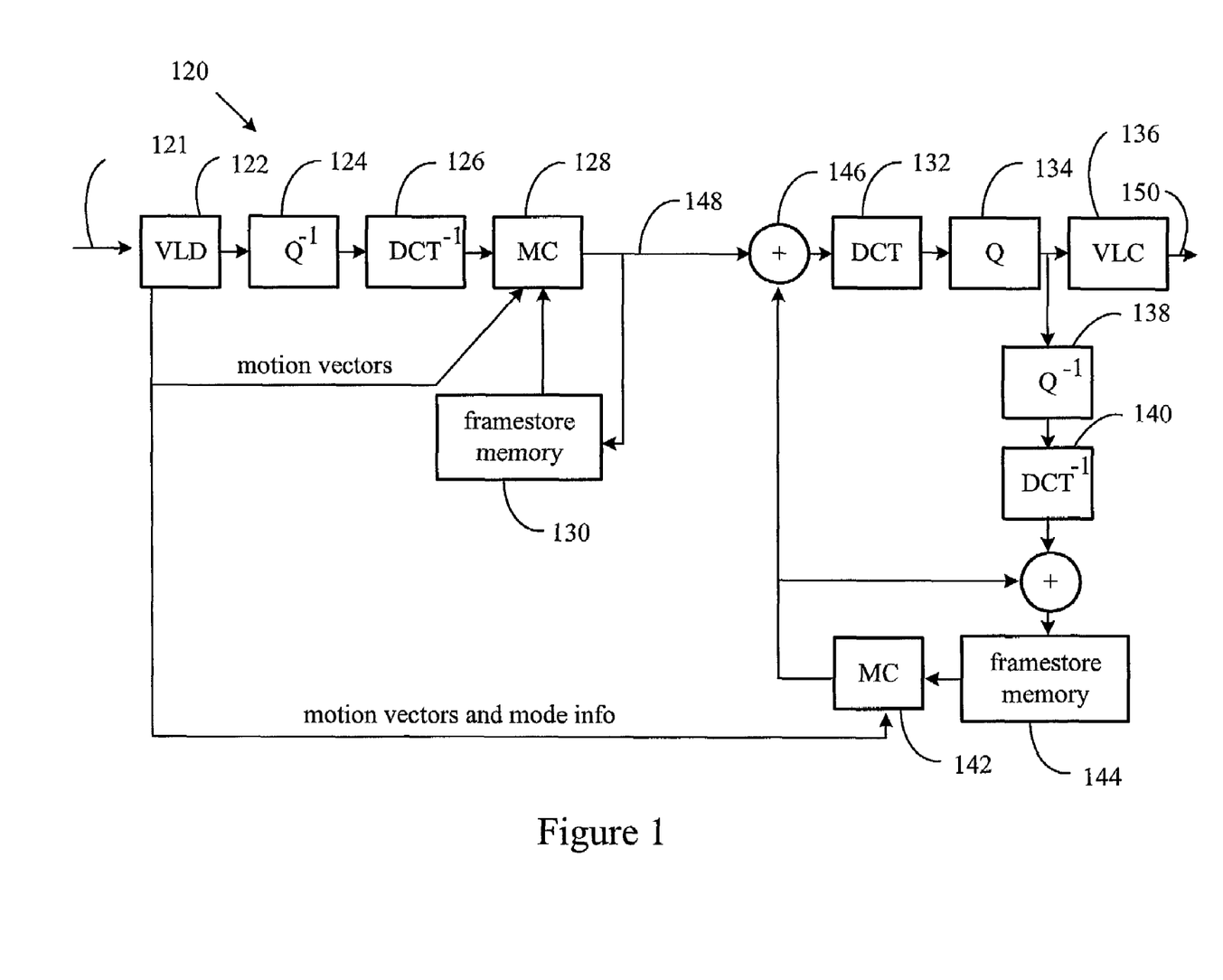
FIG. 1 is diagrammatic representation of a system that can use the techniques of the present invention, according to specific embodiments.

FIG. 1 is a diagrammatic representation of a system having inverse transform operations that can use the techniques of the present invention, according to various embodiments. Although FIG. 1 will be described in detail to show a system for rescaling data, the techniques of the present invention are completely general, and can be used in a variety of systems that use inverse transform operations.

FIG. 1 illustrates a block diagram of the processing required for requantization via one type of motion compensation requantization scheme 120 and motion vector re-use. Recoding in this case begins by receiving compressed video data at 121. The video data is then decoded comprising variable length decoding 122, dequantization 124, inverse transform coding 126 and motion compensation 128. Motion compensation 128 includes an iterative process where P-frames and B-frames are reconstructed using a framestore memory 130. Encoding includes processing the video data with transform coding 132, requantization 134, and VLC encoding 136. For bit rate reduction of the video data, requantization 134 is performed with a larger quantization step value.

After transform coding 132 and requantization 134, each image is decoded by dequantization 138 and inverse transform coding 140 before motion compensation 142 with the motion vectors and mode info provided by VLD 122. Motion compensation 142 includes an iterative process where P-frames and B-frames are reconstructed using a framestore memory 144. Motion compensation 142 produces a predicted picture that is summed 146 with the next decoded picture 148 and encoded by transform coding 132, requantization 134, and VLC encoding 136. This iterative process of motion compensation 142 with motion vector re-use and re-encoding at 132, 134, and 136 produces compressed video data 150 having a lower bit rate than received at 121.

The requantized compressed video data 150 may then be combined with other requantized compressed video data and transmitted onto a channel. Drift in the reference I and P-pictures is represented by the difference between the two framestore memories 130 and 144 due to requantization. The motion compensated requantization scheme 120 takes into account the drift in generating the video data 150, and hence provides quality video re-encoding, particularly when the bit rate reduction ratio is large. It should be noted that inverse transform coding operations are required at 126 and 140. Each of the inverse transform coding operations can be computationally expensive. It is desirable to provide the efficient techniques of the present invention for performing inverse transform coding operations.

Figure 2:
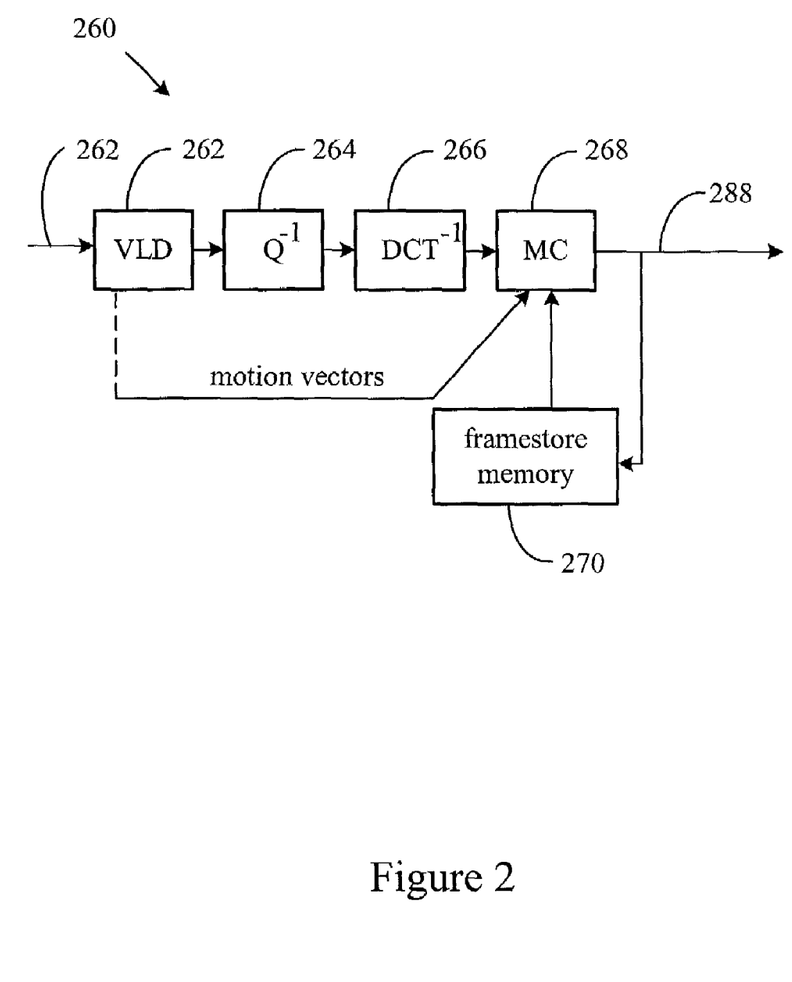
FIG. 2 is a diagrammatic representation of another system that can use the techniques of the present invention, according to specific embodiments.

FIG. 2 is a diagrammatic representation of another example of a system that can use the techniques of the present invention. FIG. 2 shows decoding using inverse transform coding operations. According to various embodiments, decoding begins by receiving compressed video data at 261. The video data is then decoded comprising variable length decoding 262, dequantization 264, inverse transform coding 266 and motion compensation 268. Motion compensation 266 includes an iterative process where P-frames and B-frames are reconstructed using a framestore memory 270. The decoded pictures or frames are provided at 188. The decoded frames can be provided to an output device for display.

Figure 3:
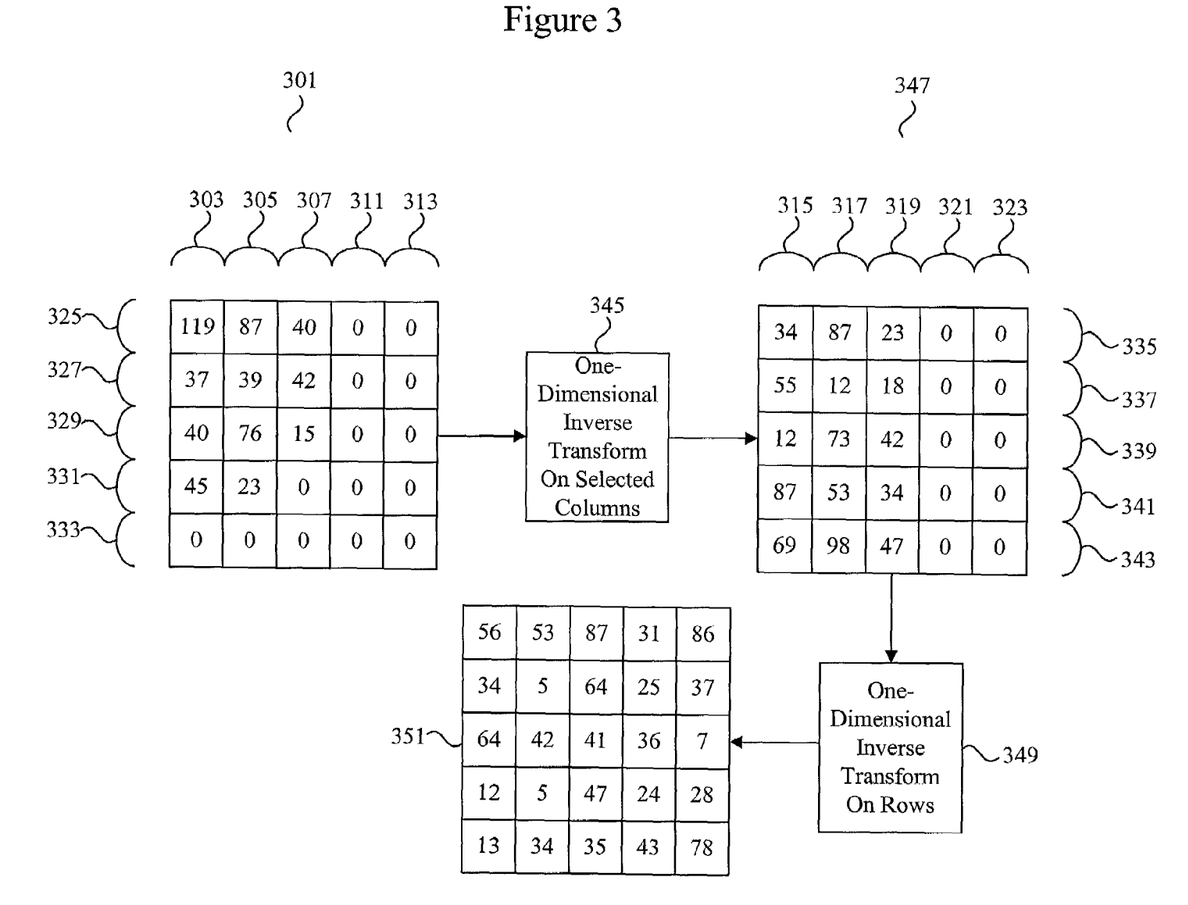
FIG. 3 is a diagrammatic representation depicting inverse transform operations performed on selected rows and columns of a block.

FIG. 3 is a diagrammatic representation showing the application of an inverse transform on a block of transform coefficients. A transform coefficient block 301 contains rows 325, 327, 329, 331, and 333 and columns 303, 305, 307, 311, and 313. Although the block of transform coefficients is shown as a five by five matrix, it will be understood that transform coefficients blocks can have a range of different sizes. The values in the blocks are also provided for illustrative purposes and do not necessarily reflect actual values resulting from DCT or inverse DCT operations.

FIG. 3 will be described in the context of MPEG-2, although the techniques of the present invention are completely general and can be used in a variety of contexts. In MPEG-2, transform coefficients blocks are typically eight by eight matrixes of DCT coefficients. The coefficients in the upper left-hand corner of a block of transform coefficients roughly correspond to the low frequency components of a portion of the frame. The coefficients in the lower right hand corner of the block of coefficients roughly correspond to the high frequency components of the portion of the frame.

To apply an inverse transform on the transform coefficient block 301 in MPEG-2, a two-dimensional inverse DCT is typically applied. Applying a two-dimensional inverse DCT, however, does not take advantage of the DCT coefficient value characteristics in block 301. Applying a two-dimensional inverse DCT calculates the inverse transform for the entire five by five matrix. Equation one shows the function for calculating the inverse DCT.

coefficients. Like two-dimensional inverse DCT operations, one-dimensional inverse DCT operations can also be computationally expensive. It would be useful to minimize the number of one-dimensional inverse DCT operations performed. One way of reducing the number of one-dimensional inverse DCT operations is to analyze the characteristics of the block of transform coefficients. Performing one-dimensional inverse DCT operations on a row or column of zeros yields a row or column of zeros. In addition, the one-dimensional inverse DCT operations on a row or column of near zeros can be approximated by a row or column of zeros.

Consequently, one-dimensional inverse DCT operations do not need to be performed on rows or columns containing all zeros values or values close to zero. Values close to zero or near zero can be determined by identifying values below a set factor such as 2. Alternatively, values near zero may be determined as less than one percent of the average or maximum of all values. The number of one-dimensional inverse DCT operations performed on a block of transform coefficients can be reduced by identifying zero patterns in the block. By identifying zero patterns and deriving zero pattern information, one-dimensional inverse DCT operations can be performed on a subset of the rows and columns of a block of DCT $$\text{Pixel}(x, y) = \frac{1}{\sqrt{2N}} \sum_{i=0}^{N-1} \sum_{j=0}^{N-1} C(i)C(j)DCT(i, j)\cos\left[\frac{(2x+1)i\pi}{2N}\right]\cos\left[\frac{(2y+1)j\pi}{2N}\right] \quad \text{(Equation 1)}$$

where $C(x) = \frac{1}{\sqrt{2}}$ if $x$ is 0, else 1 if $x > 0$; and $N$ is the number of rows or columns in a matrix.

Although there may be specialized hardware for calculating two-dimensional inverse DCT operations, the inverse transform operations are typically computationally expensive. For time sensitive content such as real-time video, any delay may be undesirable as it may be detectable by a viewer.

Equation 2 shows the breakdown of the two-dimensional inverse DCT into separate one-dimensional inverse DCT operations applied to the rows and columns of the block of transform coefficients 301.

transform coefficients while preserving the information contained in the DCT transform coefficient block.

According to various embodiments, the techniques of the present invention contemplate identifying a zero pattern in block 301 to acquire zero pattern information. The zeros in block 301 are located primarily columns 311 and 313. A row of zeros can also be located at 333. As will be appreciated by one of skill in the art, blocks of coefficients may contain a number of zeros in the lower right hand corner of the block $$\text{Pixel}(x, y) = \frac{1}{\sqrt{2N}} \sum_{i=0}^{N-1} C(i)\left[\sum_{j=0}^{N-1} C(j)DCT(i, j)\cos\left[\frac{(2y+1)j\pi}{2N}\right]\right]\cos\left[\frac{(2x+1)i\pi}{2N}\right] \quad \text{(Equation 2)}$$

where $C(x) = \frac{1}{\sqrt{2}}$ if $x$ is 0, else 1 if $x > 0$; and $N$ is the number of rows or columns in a matrix.

Equation 2 can be used to calculate the one-dimensional inverse transform on the coefficients of the columns of block 301. The one-dimensional inverse transform on the columns can be followed by one-dimensional inverse transform on the rows of block 301, or vice versa. One-dimensional inverse DCT operations applied to the rows and columns of a block of transform coefficients yields the same results as a two-dimensional inverse DCT operations applied to a block of transform when only low frequency information is represented in the portion of the frame. A portion of a frame showing white space would typically be encoded as a transform coefficient block containing only a few DCT coefficients in the upper left hand corner. Zero patterns are also predominant during requantization or even during initial quantization with a high quantization scale. Zero patterns are also frequent when filters are applied to blocks of transform coefficients. As will be appreciated by one of skill in the art, zero patterns exist in a variety of different blocks including blocks from MPEG I-frames, P-frames, and B-frames. Applying filters to blocks of transform coefficients is described in U.S. patent application Ser. No. 09/867,966 by Wu et al., and titled Methods and Apparatus for Transform Coefficient Filtering, the entirety of which is incorporated by reference for all purposes.

Generally, determining the location of zero values or near zero values in a block of transform coefficients is referred to herein as identifying zero patterns and zero pattern information. In block 301, zeros are found primarily in columns 311 and 313. One-dimensional inverse transform operations are performed on column 303, 305, and 307 to yield the values in columns 315, 317, and 319 respectively. Columns 321 and 323 in block 347 are populated with zeros. To calculate the actual pixel values associated with block 347, the one-dimensional inverse DCT transform operations are applied to all of the rows of block 347. As shown, the one-dimensional inverse DCT transform operations are applied to row 335, 337, 339, 341, and 343 at 349 to yield the actual pixel value block 351. Consequently, one-dimensional inverse DCT transform operations are performed on a subset of the rows and columns of the block of transform coefficients. Instead of performing inverse transform operations on all columns 303–313 and all rows 325–333, one-dimensional inverse DCT transform operations are only performed on columns 303–307 and columns 325–333.

Figure 4:
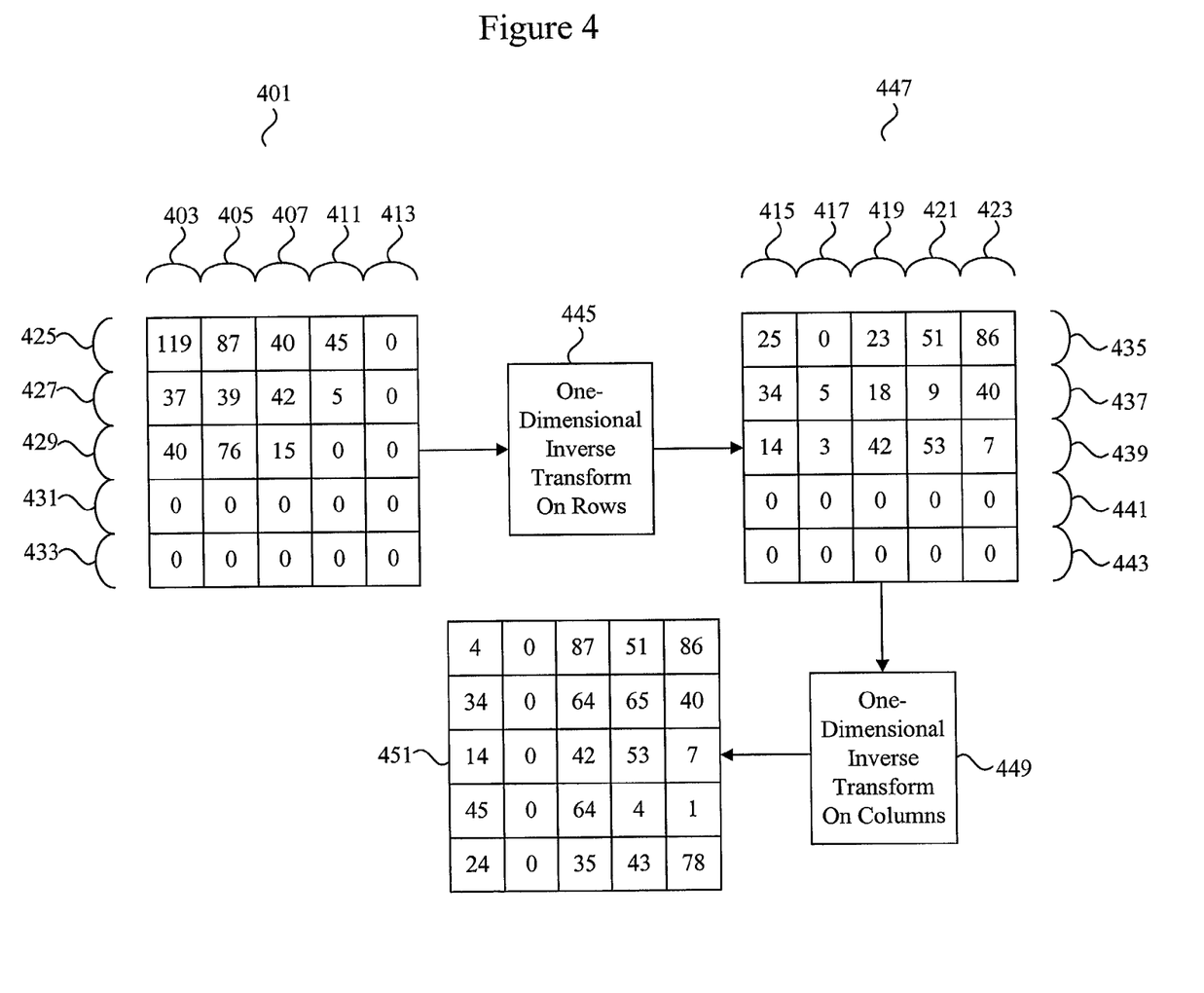
FIG. 4 is a diagrammatic representation depicting inverse transform operations performed on selected rows and columns of a block.

FIG. 4 is a diagrammatic representation showing application of one-dimensional inverse transform operations on selected rows of block 401. Identifying zero pattern information in block 401 indicates that zeros can be found primarily in two rows 431 and 433 and in one column 413. There are more rows of zeros than there are columns of zeros. Generally, rows of zeros or columns of zeros refer to rows or columns containing mostly zeros or values close to zero. Fewer one-dimensional inverse DCT operations will be performed if the one-dimensional inverse transforms are calculated for the rows first instead of the columns first as shown in FIG. 3. Using the zero pattern information, one-dimensional inverse transforms are performed on selected rows 425, 427, and 429 that represent a subset of all rows in the block 401 to yield rows 435, 437, and 439 of block 447. Rows 441 and 443 are populated with zeros. According to various embodiments, zero pattern information can be obtained for block 447. Column 417 contains values that are close to zero. As noted above, a one-dimensional inverse transform applied to a column of values close to zero can be approximated by a column of zeros. If, as one example, a factor of 5 is set here as a threshold to determine near-zero columns, column 417 can be filtered as a zero column. One-dimensional inverse transforms can then be applied to columns 415, 419, 421, and 423 to yield pixel block 451.

Figure 5:
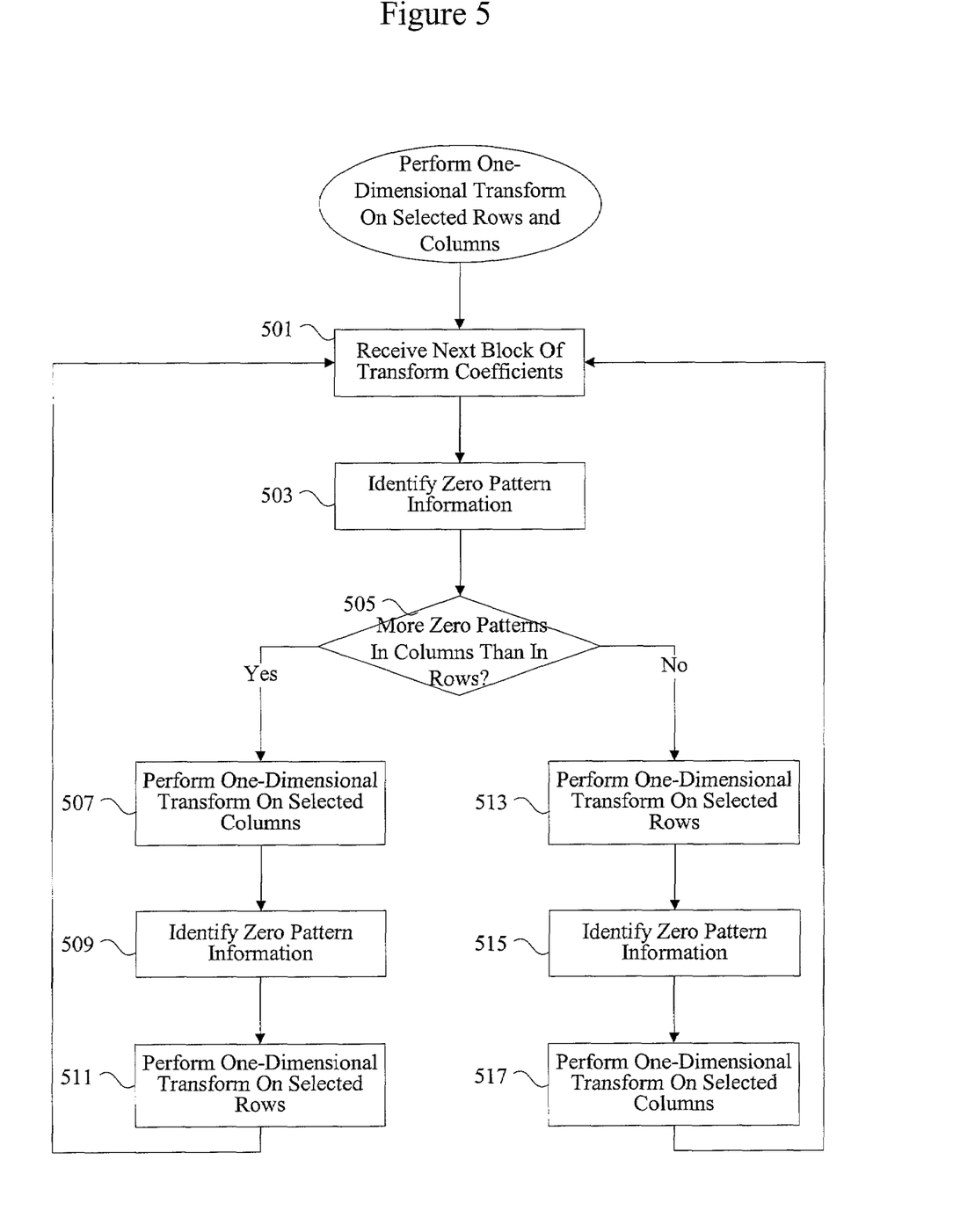
FIG. 5 is a process flow diagram showing techniques for performing inverse transform operations on rows and columns of a block.

FIG. 5 is a process flow diagram showing the calculation of one-dimensional inverse transforms on selected rows and columns of a block of transform coefficients. FIG. 5 will be described with reference to FIG. 4. At 501 the next transform coefficient block 401 is received. Zero pattern information is identified at 503 in block 401. The zeros are found primarily in rows 431 and 433 and in column 413. At 505, it is determined whether there are more columns or rows of zeros. According to various embodiments, zeros include values of near zero such as 3 or 5. Since block 401 has two rows of zeros and only one column of zeros, one-dimensional inverse transforms are performed on selected rows 425, 427, and 429. At 515, zero pattern information for block 447 can optionally be identified. Identifying zero pattern information for block 447 indicates that zeros are located in column 417.

One-dimensional inverse transforms are performed on columns 415, 419, 421, and 423 to yield actual pixel block 451. The next block of transform coefficients is then received at 501. It should be noted that the process flow described in FIG. 5 does not need to be performed in any particular sequence. For example, one-dimensional inverse transforms may be performed on all of the selected rows of a block of transform coefficients simultaneously. The identification of zero pattern information at 509 and at 515 are optional. A determination at 505 whether there are more columns or rows of zeros is also optional, and a system using the techniques of the present invention can be configured to perform one-dimensional transforms on columns or rows first regardless of zero pattern information. In one example, the system can be configured to perform one-dimensional inverse transform operations on a subset of the total number of columns using zero pattern information. One-dimensional inverse transform operations are then performed on all the rows without regard to zero pattern information.

The present invention for filtering transform coefficients to provide rate reduction in a bitstream can be implemented in various network systems. In various embodiments, this can be implemented in the headend of high bandwidth networks such as a cable network or a satellite network. In the context of a cable network, the invention is implemented in a standalone system, such as Cisco 6920 RateMux® available from Cisco Systems, Inc, or in a line card of a cable modem headend such as the Cisco UBR 7200 also available from Cisco Systems, Inc.

Figure 6:
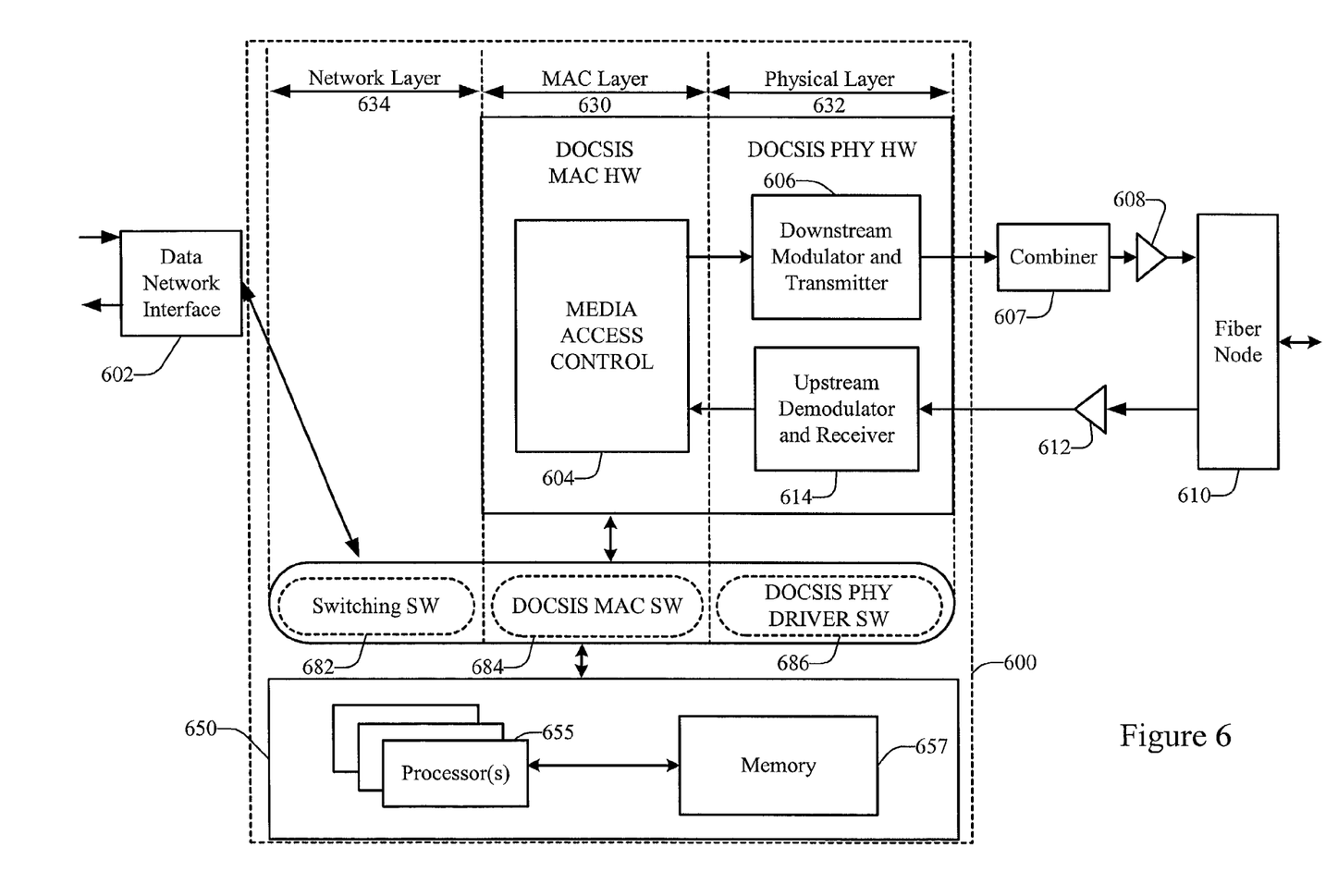
FIG. 6 is a diagrammatic representation of a system that can be used to implement the present invention.

FIG. 6 depicts the basic components of a cable modem headend that can be used to implement the present invention, according to specific embodiments. Although the techniques of the present invention can be integrated into a cable modem headend, the present invention can also be used in a standalone system. FIG. 6 shows an implementation using the cable modem headend.

A Data Network Interface 602 is an interface component between an external data source and the cable system. External data sources transmit data to data network interface 602 via optical fiber, microwave link, satellite link, or through various other media. Also as mentioned above, a Media Access Control Block (MAC Block) 604 receives data packets from a Data Network Interface 602 and encapsulates them with a MAC header.

In a specific embodiment as shown in FIG. 6, CMTS provides functions on three network layers including a physical layer 632, a Media Access Control (MAC) layer 630, and a network layer 634. Generally, the physical layer is responsible for receiving and transmitting RF signals on the cable plant. Hardware portions of the physical layer include a downstream modulator and transmitter 606 and an upstream demodulator and receiver 614. The physical layer also includes software 686 for driving the hardware components of the physical layer.

Once an information packet is demodulated by the demodulator/receiver 614, it is then passed to MAC layer 630. A primary purpose of MAC layer 630 is to encapsulate and decapsulate packets within a MAC header, preferably according to the above-mentioned DOCSIS standard for transmission of data or other information.

MAC layer 630 includes a MAC hardware portion 604 and a MAC software portion 684, which function together to encapsulate information packets with the appropriate MAC address of the cable modem(s) on the system. After the upstream information has been processed by MAC layer 630, it is then passed to network layer 634. Network layer 634 includes switching software 682 for causing the upstream information packet to be switched to an appropriate data network interface on data network interface 602.

When a packet is received at the data network interface 602 from an external source, the switching software within network layer 634 passes the packet to MAC layer 630. MAC block 604 transmits information via a one-way communication medium to downstream modulator and transmitter 606. Downstream modulator and transmitter 606 takes the data (or other information) in a packet structure and converts it to modulated downstream frames, such as MPEG or ATM frames, on the downstream carrier using, for example, QAM modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 607. Converter 608 converts the modulated RF electrical signals to optical signals that can be received and transmitted by a Fiber Node 610 to the cable modem hub.

It is to be noted that alternate embodiments of the CMTS (not shown) may not include network layer 634. In such embodiments, a CMTS device may include only a physical layer and a MAC layer, which are responsible for modifying a packet according to the appropriate standard for transmission of information over a cable modem network. The network layer 634 of these alternate embodiments of CMTS devices may be included, for example, as part of a conventional router for a packet-switched network.

In a specific embodiment, the network layer of the CMTS is configured as a cable line card coupled to a standard router that includes the physical layer 632 and MAC layer 630. The techniques of the present invention including a filter stage and rate control stage shown in FIG. 1 can be implemented on a line card. Using this type of configuration, the CMTS is able to send and/or receive IP packets to and from the data network interface 602 using switching software block 682. The data network interface 602 is an interface component between external data sources and the cable system. The external data sources transmit data to the data network interface 602 via, for example, optical fiber, microwave link, satellite link, or through various media. The data network interface includes hardware and software for interfacing to various networks such as, for example, Ethernet, ATM, frame relay, etc.

As shown in FIG. 6, the CMTS includes a hardware block 650 including one or more processors 655 and memory 657. These hardware components interact with software and other hardware portions of the various layers within the CMTS. Memory 657 may include, for example, I/O memory (e.g. buffers), program memory, shared memory, etc. Hardware block 650 may physically reside with the other CMTS components.

In one embodiment, the software entities 682, 684, and 686 are implemented as part of a network operating system running on hardware 650. Further, the provisions of this invention for providing quality of service for multicast streams are preferably implemented in software as part of the operating system.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. For example, the headend has a variety of embodiments which include a cable modem termination system coupled to a router or a multicast router. A cable modem can also be a separate entity or entirely integrated into a client system. In addition and as mentioned above, the invention may be implemented in both differential and single-ended configurations. Therefore, the scope of the invention should be determined with reference to the appended claims.

What is claimed is:

1. A method, comprising:
applying a filter to a block of transform coefficients;
identifying zero patterns in the block of transform coefficients to derive zero pattern information, wherein identifying zero patterns comprises determining the location of zero values or near zero values in the block of transform coefficients, wherein the filter increases the number of zero values, wherein a transform coefficient is determined to be near zero when it falls under a percentage of a value calculated using plurality of transform coefficients in the block;
performing one-dimensional inverse transforms on a subset of the total number of rows in the block of transform coefficients before performing one-dimensional inverse transforms on all of the columns in the block of transform coefficients when it is determined that there are more rows of zeros than columns of zeros;
requantizing and reencoding video data to obtain requantized video data having a bit rate lower than the bit rate of the received compressed video data, wherein the requantized video data has a bit rate reduced by a bit rate reduction ratio associated with zero patterns.

2. The method of claim 1, wherein the block of transform coefficients is an MPEG encoded block of 8×8 discrete cosine transform (DCT) coefficients.

3. The method of claim 1, further comprising setting a threshold for determining a near zero value in zero patterns.

4. The method of claim 1, wherein performing one-dimensional inverse transforms further comprises performing one-dimensional transforms on all the columns in the block of transform coefficients.

5. The method of claim 1, wherein the transcoding is performed on MPEG bitstream.

6. The method of claim 1, wherein performing one-dimensional inverse transforms occurs during decoding.

7. The method of claim 6, wherein the decoding is performed on MPEG bitstreams.

8. An apparatus comprising:
a filter operable to filter the block of transform coefficients;
inverse transform coding logic operable to identify zero patterns in the block of transform coefficients to derive zero pattern information, wherein the filter increases the number of zero values, wherein identifying zero patterns comprises determining the location of zero values or near zero values in the block of transform coefficients, wherein a transform coefficient is determined to be near zero when it falls under a percentage of a value calculated using plurality of transform coefficients in the block, wherein the inverse transform coding logic is further operable to performing one-dimensional inverse transforms on a subset of the total number of rows in the block of transform coefficients before performing one-dimensional inverse transforms on all of the columns in the block of transform coefficients when it is determined that there are more rows of zeros than columns of zeros;

requantization logic and a reencoder operable to obtain requantized video data having a bit rate lower than the bit rate of the received compressed video data, wherein the requantized video data has a bit rate reduced by a bit rate reduction ratio associated with zero patterns.

9. The apparatus of claim 8, wherein the block of transform coefficients is an MPEG encoded block of 8×8 DCT coefficients.

10. The apparatus of claim 8, wherein performing one-dimensional inverse transforms further comprises performing one-dimensional transforms on all the columns in the block of transform coefficients.

11. An apparatus, comprising:

means for applying a filter to the block of transform coefficients;

means for identifying zero patterns in the block of transform coefficients to derive zero pattern information, wherein the filter increases the number of zero values, wherein identifying zero patterns comprises determining the location of zero values or near zero values in the block of transform coefficients, wherein a transform coefficient is determined to be near zero when it falls under a percentage of a value calculated using plurality of transform coefficients in the block;

means for performing one-dimensional inverse transforms on a subset of the total number of rows in the block of transform coefficients before performing one-dimensional inverse transforms on all of the columns in the block of transform coefficients when it is determined that there are more rows of zeros than columns of zeros;

means for requantizing and reencoding video data to obtain requantized video data having a bit rate lower than the bit rate of the received compressed video data, wherein the requantized video data has a bit rate reduced by a bit rate reduction ratio associated with zero patterns.

12. The apparatus of claim 11, wherein the block of transform coefficients is an MPEG encoded block (8×8 DCT coefficients).

13. The apparatus of claim 11, further comprising setting a threshold for determining a near zero value in zero patterns.

14. The apparatus of claim 11, wherein performing one-dimensional inverse transforms father comprises performing one-dimensional transforms on all the columns in the block of transform coefficients.

15. The apparatus of claim 11, wherein performing one-dimensional inverse transforms occurs during transcoding.

16. The apparatus of claim 15, wherein the transcoding is performed on MPEG bitstreams.

17. The apparatus of claim 11, wherein performing one-dimensional inverse transforms occurs during decoding.

18. The apparatus of claim 17, wherein the decoding is performed on MPEG bitstreams.

19. A computer readable medium having computer code embodied therein, the computer readable medium comprising:

computer code stored on the computer readable medium for applying a filter to the block of transform coefficients;

computer code stored on the computer readable medium for identifying zero patterns in the block of transform coefficients to derive zero pattern information, wherein the filter increases the number of zero values, wherein identifying zero patterns comprises determining the location of zero values or near zero values in the block of transform coefficients, wherein a transform coefficient is determined to be near zero when it falls under a percentage of a value calculated using plurality of transform coefficients in the block;

computer code stored on the computer readable medium for performing one-dimensional inverse transforms on a subset of the total number of rows in the block of transform coefficients before performing one-dimensional inverse transforms on all of the columns in the block of transform coefficients when it is determined that there are more rows of zeros than columns of zeros;

computer code stored on the computer readable medium for requantizing and reencoding video data to obtain requantized video data having a bit rate lower than the bit rate of the received compressed video data, wherein the requantized video data has a bit rate reduced by a bit rate reduction ratio associated with zero patterns.

20. The computer readable medium of claim 19, wherein the block of transform coefficients is an MPEG encoded block.

21. The computer readable medium of claim 19, further comprising setting a threshold for determining a near zero value in zero patterns.

22. The computer readable medium of claim 19, wherein performing one-dimensional inverse transforms further comprises performing one-dimensional transforms on all the columns in the block of transform coefficients.

23. The computer readable medium of claim 19, wherein performing one-dimensional inverse transforms occurs during transcoding.

24. The computer readable medium of claim 23, wherein the transcoding is performed on MPEG bitstreams.

25. The computer readable medium of claim 19, wherein performing one-dimensional inverse transforms occur during decoding.

26. The computer readable medium of claim 25, wherein the decoding is performed on MPEG bitstreams.

* * * * *

UNITED STATES PATENT AND TRADEMARK OFFICE
CERTIFICATE OF CORRECTION

PATENT NO. : 7,656,949 B1 Page 1 of 1
APPLICATION NO. : 09/894113
DATED : February 2, 2010
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this

Twenty-eighth Day of December, 2010

David J. Kappos
*Director of the United States Patent and Trademark Office*